Dec. 31, 1940.    J. W. LEIGHTON    2,226,621
RADIUS ROD
Filed May 23, 1938    3 Sheets-Sheet 1
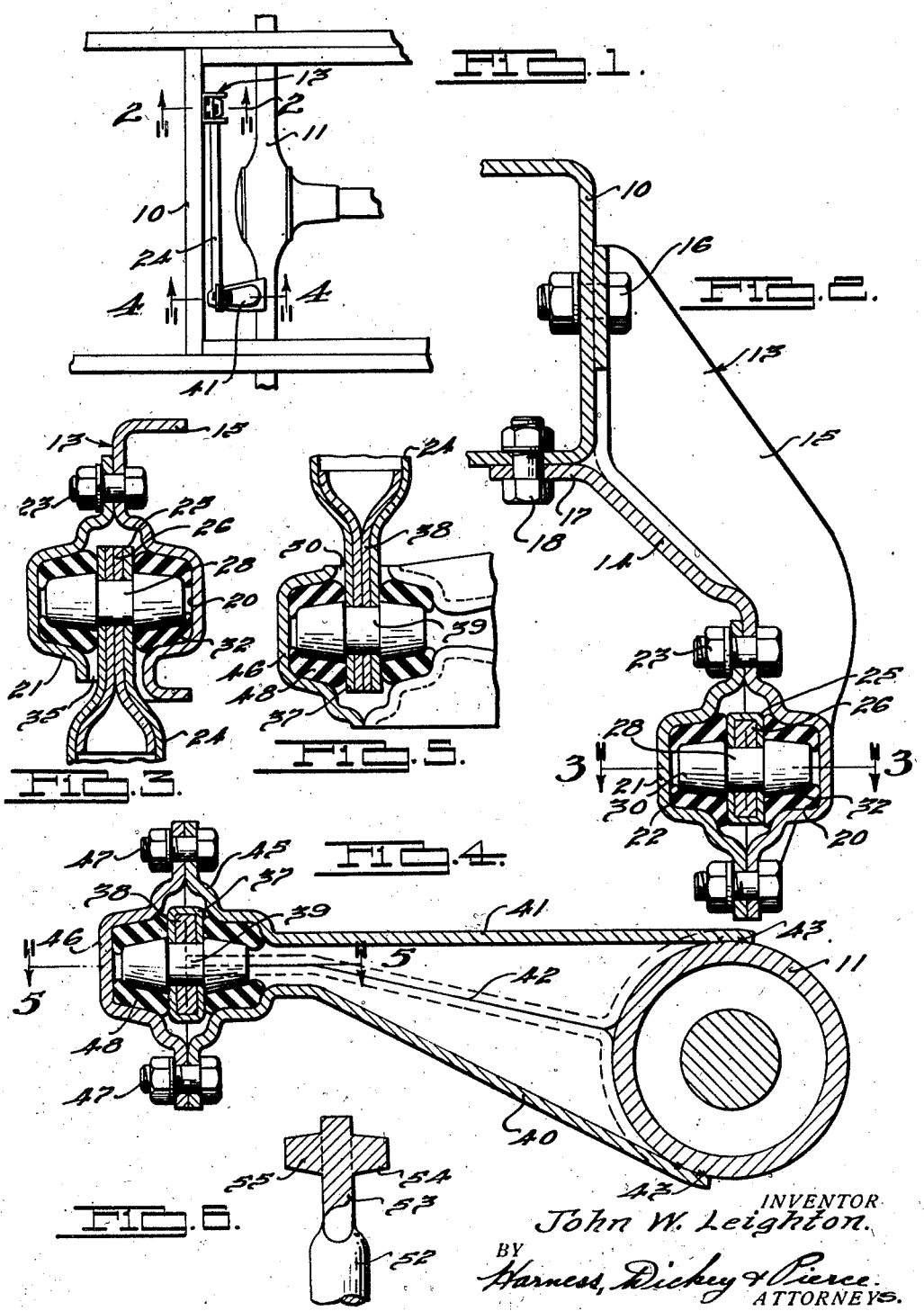
INVENTOR
John W. Leighton.
BY Harness, Dickey & Pierce
ATTORNEYS.

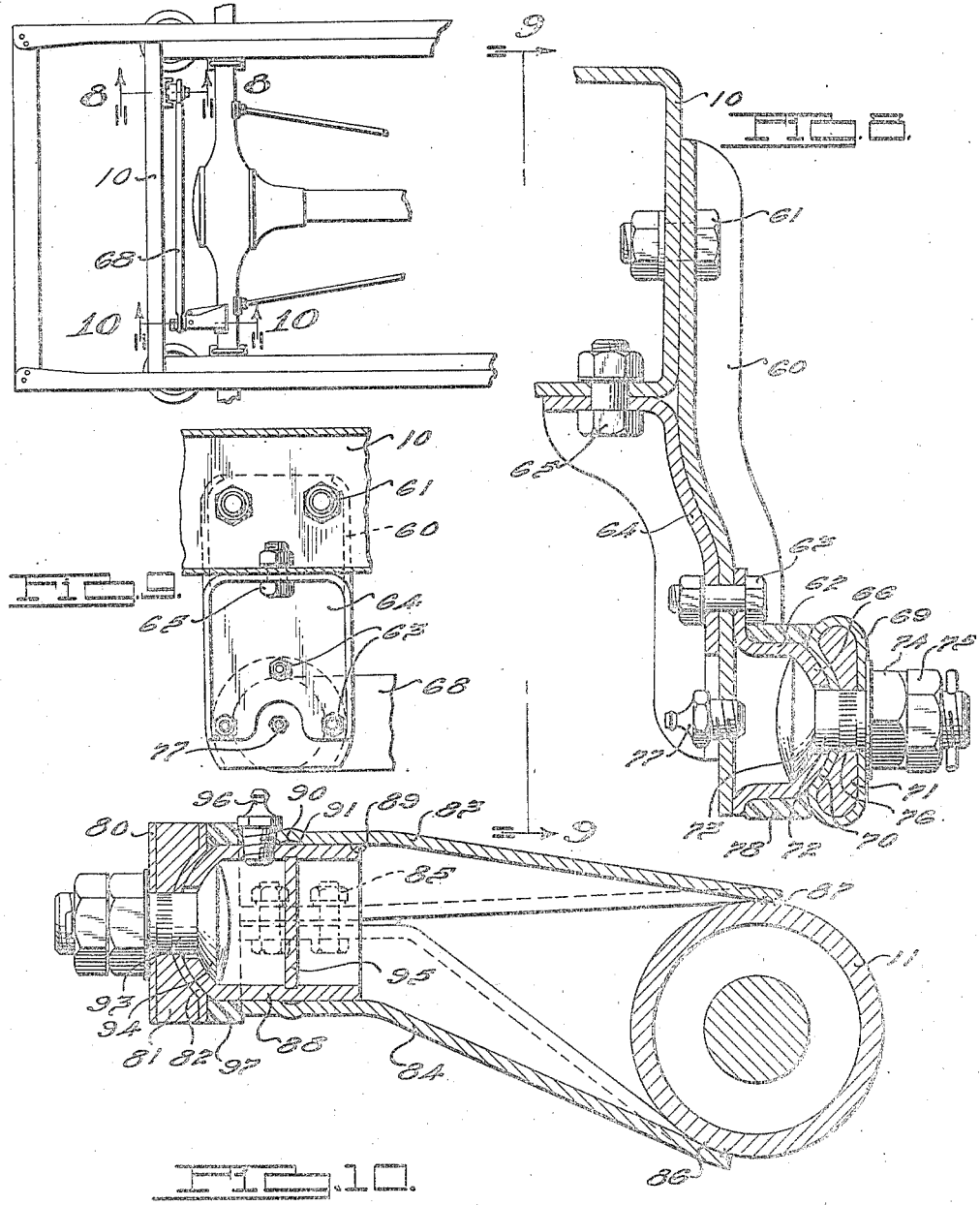

Dec. 31, 1940.    J. W. LEIGHTON    2,226,621
RADIUS ROD
Filed May 23, 1938    3 Sheets-Sheet 3
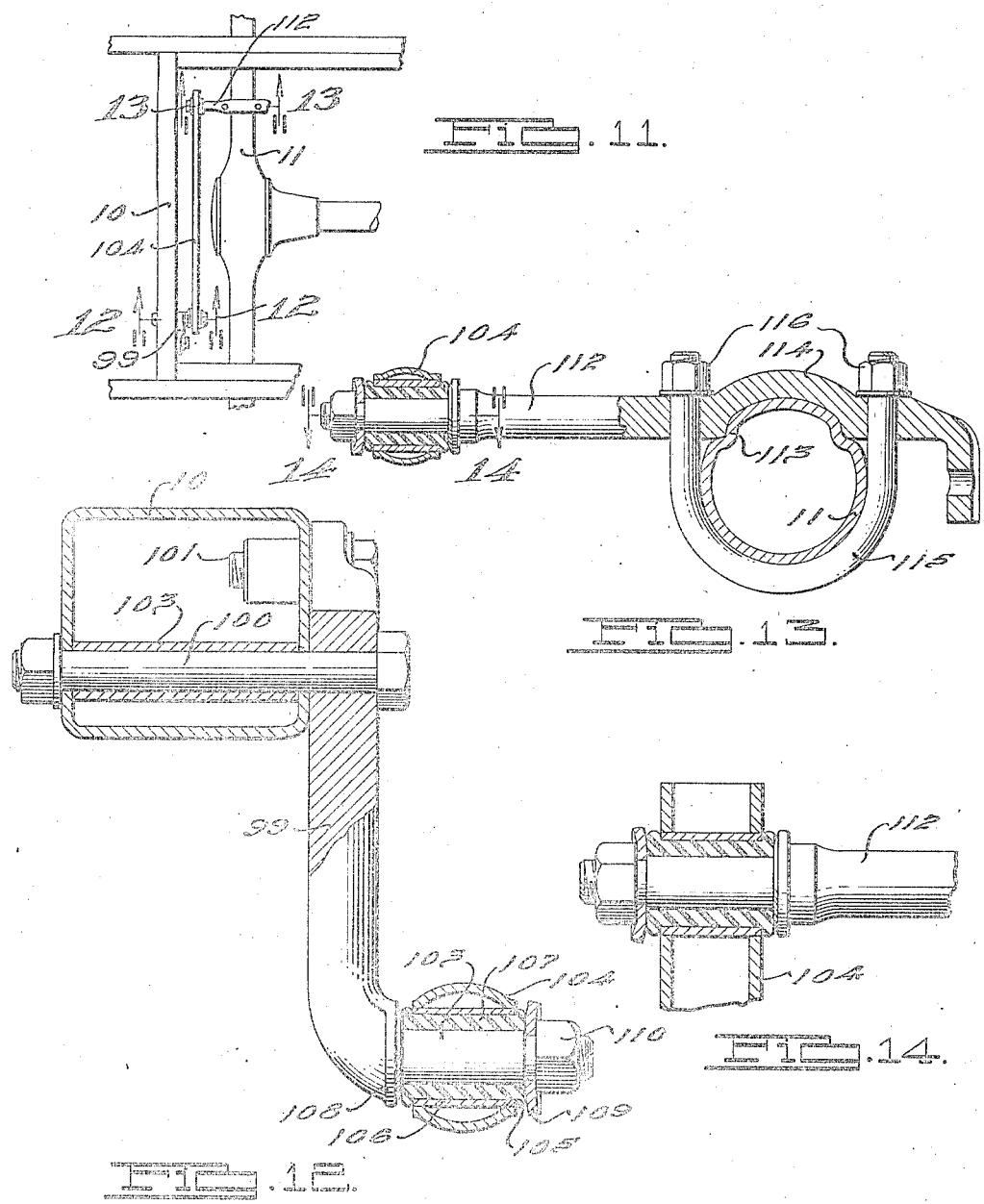
INVENTOR
John W. Leighton.
BY
Harness, Dickey & Pierce.
ATTORNEYS.

Patented Dec. 31, 1940

2,226,621

UNITED STATES PATENT OFFICE 2,226,621

RADIUS ROD

John W. Leighton, Port Huron, Mich.

Application May 23, 1938, Serial No. 209,429

12 Claims. (Cl. 267—67)

The invention relates generally to motor vehicles and it has particular relation to arrangements of radius rods for connecting a rear axle housing to the vehicle frame.

In general, one object of the invention is to provide improvements in the radius rod connection between the frame and axle housing, which will be simple and inexpensive to manufacture and assemble with the motor vehicle, to the end that the cost of manufacturing the vehicle will be decreased.

Another object of the invention is to provide a radius rod arrangement for laterally stabilizing the frame, which will provide improved pivotal connections for accommodating various desirable movements required during movement of the vehicle.

Other objects of the invention will become apparent from the following specification, the drawings relating thereto, and from the claims hereinafter set forth.

For a better understanding of the invention, reference may be had to the drawings, wherein:

Figure 1 is a fragmentary plan view of a motor vehicle, illustrating a radius rod arrangement constructed according to one form of the invention;

Fig. 2 is a cross-sectional view on a larger scale, taken substantially along the line 2—2 of Fig. 1;

Fig. 3 is a view taken substantially along the line 3—3 of Fig. 2.

Fig. 4 is a cross-sectional view on a larger scale, taken substantially along the line 4—4 of Fig. 1;

Fig. 5 is a view taken substantially along the line 5—5 of Fig. 4;

Fig. 6 illustrates one end of a radius rod, partly in cross-section, as constructed according to another form of the invention;

Fig. 7 is a fragmentary plan view, similar to Fig. 1, illustrating another form of the invention;

Fig. 8 is a cross-sectional view on a larger scale, taken substantially along the line 8—8 of Fig. 7;

Fig. 9 is an elevational view, as seen along the line 9—9 of Fig. 8;

Fig. 10 is a cross-sectional view on a larger scale, taken substantially along the line 10—10 of Fig. 7;

Fig. 11 is a fragmentary plan view, similar to Figs. 1 and 7, illustrating still another form of the invention;

Fig. 12 is a cross-sectional view on a larger scale, taken substantially along the line 12—12 of Fig. 11;

Fig. 13 is a cross-sectional view on a larger scale, taken substantially along the line 13—13 of Fig. 11; and Fig. 14 is a cross-sectional view taken substantially along the line 14—14 of Fig. 13.

Referring to Fig. 1, the rear cross member of a chassis frame is indicated at 10 and the rear axle housing is indicated at 11. While no spring arrangement is illustrated, it will be understood that the frame is to be supported on the axle housing, such as by coil springs that normally would have insufficient resistance to relative movement of the frame and axle in a transverse or lateral direction. This is at least one reason for using a radius rod arrangement which does not interfere with relative up and down movement of the frame and axle housing, but which prevents undesirable lateral movement.

Referring particularly to Fig. 2, a bracket 13 is provided that is formed from sheet metal and this bracket has a base portion 14 and side legs 15 for rendering it strong and rigid. The upper end portion of the base is secured to the cross frame member 10 by bolts 16 and a central tongue portion struck from the base, as indicated at 17, is secured by a bolt 18 to the under side of the cross-frame member. At its lower end, the bracket is shaped to provide a generally cup shaped recess 20. A cap or plate 21, similarly formed with a recess 22, is fastened to the bracket by means of bolts 23, and the two recess portions jointly form a housing for receiving a pivotal connection between a radius rod and the bracket.

The radius rod is indicated at 24, and generally throughout its length is of round but tubular character and the end thereof adapted to be connected to the bracket 13 is flattened substantially to a rectangular shape, as indicated at 25. A metal insert 26 is disposed in the end portion of the rod and such insert may be initially tubular and then flattened into substantially rectangular shape when the end of the rod is flattened. A pin 28 extends through such flattened end of the rod and through the insert and opposite ends of the pin are upset to form heads 29 and 30 of frusto-conical character. These heads, respectively, are disposed in the recesses 20 and 22 of the housing formed on the bracket and between each head and the wall of the recess, a rubber bushing 32 is provided.

As best shown by Fig. 3, that side of the housing, from which the rod 10 is to project, is open, as indicated at 35, and it will be appreciated that this is accomplished by shaping the bracket and cover plate 21, accordingly. It is to be understood that the opening 35 is of such character that the rod 10 may pivot vertically about the axis of the pin 28 a sufficient amount to accommodate the desired range of relative vertical movement between the frame and axle housing, and furthermore that the opening is of such width that the desired amount of relative movement of the frame and axle housing in a direction longitudinally of the frame may be accommodated. It is apparent that a relatively large degree of movement of the rod and bracket relatively about the axis of the pin 28 is permitted and that relative movement of these parts in other directions is also permitted by the deformability and flexibility of the rubber.

At its opposite end, the rod is similarly flattened, as indicated at 37, and similarly is provided with an insert 38 and a pin 39 having conical head portions on opposite ends. In this instance, a bracket is provided which is formed of two parts 40 and 41 that are welded along a junction line 42 and also welded to the axle housing, as indicated at 43. These two parts of the bracket at their outer ends are fashioned to provide a housing part 45 of the general shape provided at the lower end of bracket 13, and similarly a cap plate 46 is provided to complete the housing and this plate is secured to the bracket parts 40 and 41 by means of bolts 47. Rubber bushings 48 similarly are provided around the conical heads on the pin 39, and as shown best by Fig. 5, an opening 50, similar to opening 35 in Fig. 3, is provided in the side of the housing to permit desired relative movement of the rod and bracket.

It is apparent that this arrangement will permit relative vertical movement of the frame and axle housing through pivotal movement about the axes of the pins on the ends of the rod and the arrangement also permits practically any other movement or combination of movements between the frame and axle housing, such as inevitably will occur during movement of the vehicle, particularly over rough surfaces. While permitting the required movement, it is evident that the arrangement prevents sidewise movement of the frame with respect to the axle housing except for such movements as are permitted by the resiliency of the bushing and this movement is resisted in a cushioned manner. It is apparent also that practically the entire assembly may be manufactured from sheet metal, and thus manufactured inexpensively as only stamping operations generally are required. A particular advantage of the arrangement is that it may be manufactured inexpensively and assembled inexpensively, while obtaining highly efficient results.

Fig. 6 illustrates a radius rod 52, which may be used in place of the radius rod previously described. This rod is of solid character and at its ends is flattened, as indicated at 53, and upset, as indicated at 54 and 55, to provide the conical portions such as provided in the previous construction by the heads on the pins. In certain cases, such a rod may be desirable, and it is evident that it may be constructed inexpensively through upsetting operations.

Referring to Figs. 7, 8, and 9, the bracket on the frame member 10 comprises a sheet metal member 60 fastened to the frame member by means of bolts 61 and this sheet metal member at its lower end has an inverted cup-shaped element 62 secured thereto by means of bolts 63. These bolts also secure a second plate member 64 to the bracket 60 and the second plate is secured to the under side of the frame member 10 by means of a bolt 65. In this manner, a rigid bracket arrangement is provided. The base of the inverted cup-shaped member 62 is substantially a spherical section, as indicated at 66, so as to provide inner and outer bearing surfaces. The radius rod, indicated at 68, is of tubular character generally as previously described, but is flattened, as indicated at 69, and shaped to provide a spherical bearing surface portion 70 that engages the outer surface of the spherical portion 66 of the cup 62. An insert 71 in the end of the rod renders it solid and the end of the rod is pivotally connected to the cup 62 by means of a bolt 72 that has a head 73 at its inner end which is formed with a spherical surface seating on the inner surface of the spherical portion 66 of the cup. Nuts 74 and 75 on the outer end of the bolt positively hold the cup and flattened end of the rod together. It will be noted that the bolt 73 is serrated, as indicated at 76, for the purpose of rotatively locking it to the rod 68 and insert 71, from which it follows that the bolt will turn with the rod, and hence during relative vertical movement of the frame and axle housing, the head on the bolt and the spherical surface on the end of the rod will have bearing movement on the inner and outer surfaces of the spherical portion 66 of the cup 62. It will be noted that the opening in the portion 66 of the cup 62, through which the bolt passes, is enlarged so that to a limited extent universal movement of the parts is permitted, in addition to the practically free vertical movement of the rod with respect to the bracket.

Attention is directed to the fact that the lower end of the bracket 60 and the cup 62 provide a closed lubricant reservoir. A grease fitting 77 enables injecting grease into this reservoir so as to lubricate the bearing surfaces. For preventing dirt from entering between the outer bearing surfaces and also preventing undesired leakage of lubricant, a rubber ring 78 may be provided around the side wall of cup, with its edge in contact with the end of the radius rod.

The opposite end of the rod is flattened, as indicated at 80, and similarly is provided with an insert 81 and a spherical bearing surface 82. Bracket members 83 and 84 are fastened together on opposite sides by bolts 85 and the joint assembly is welded to the axle housing 11, such as at the points 86 and 87. An inverted cup 88 is provided in a generally round opening 89 formed between the bracket elements 83 and 84 at their outer ends, and this cup is held in position by means of interfitting beads 90 and 91 on the bracket elements and on the cup, respectively. A bolt 93 having a spherical head portion 94 at its inner end connects the rod and cup 88 in substantially the same manner as described in connection with Fig. 8 and the same movements are permitted in this connection as described in connection with the latter figure. It will be noted that the cup 88 is closed by means of a wall 95 and that a grease fitting 96 is provided for injecting grease into the space between the wall 95 and the bearing surfaces. A rubber ring 97 is provided around the end of the cup 88 to prevent foreign matter from getting between the spherical bearing surfaces and also this ring will prevent lubricant from escaping.

Referring now to Figs. 10 and 11, the bracket secured to the cross frame member 10 is in the form of a rod 99 that is secured to the frame member by means of bolts 100 and 101, the former of which passes through the member and a supporting spacer 102. This bracket has an offset smaller end portion 103 for connection with a radius rod, indicated at 104, and the radius rod in this case is tubular and the end thereof connected to the bracket 100 has a transverse opening 105 through which the portion 103 of the bracket extends. A metal bushing 106, which may be welded in place, is provided in the opening 105, and between this metal bushing and the portion 103 of the bracket, a rubber sleeve 107 is provided. An upset collar portion 108 at the inner end of the portion 103 and a collar 109 at the outer end serve as retainers for the rubber bushing, and a nut 110 on the outer end of the portion 103 holds the collar 109 in place.

The opposite end of the radius rod is connected to a bracket 112 in the same manner and, therefore, it seems unnecessary to specifically describe this connection since the parts are substantially identical. The bracket 112 is fastened to the axle housing 11 in a rigid manner by providing an irregular shape 113 over a portion of the axle housing and a complementary portion 114 on the bracket. The bracket is held on the axle housing with the parts interfitting as mentioned, by a U-bolt 115 that extends around the axle housing and through the bracket and which is provided with fastening nuts 116 on its ends.

The axes of the bearing portions of the brackets, and hence the axes of the openings in the ends of the radius rod, through which such bearing portions project, are arranged horizontally and thus relative vertical movement of the frame and axle housing is permitted by relative turning of the parts about these axes. Other movements are accommodated readily by the resiliency of the bushings, as will be readily understood. In this arrangement, the rod can be fabricated inexpensively and the brackets may be forgings that can also be manufactured inexpensively. Assembly of the parts is simple, as will readily be evident.

While more than one form of the invention has been illustrated and described in detail, it will be apparent to those skilled in the art that various modifications may be made without departing from the scope of the appended claims.

What is claimed is:

1. In combination, a vehicle frame member, an axle member, a bracket fastened to the frame member, a bracket fastened to the axle member, a tubular radius rod extending between the brackets, and having a side wall at each end formed to provide a curved bearing surface, complementary bearing surfaces on the brackets, and means including pins passing transversely through the bearing surfaces for pivotally connecting the ends of the rod to the brackets.

2. In combination, a vehicle frame member, an axle member, a bracket fastened to the frame member, a bracket fastened to the axle member, a tubular radius rod extending between the brackets, and having a side wall at each end formed to provide a spherical bearing surface, complementary bearing surfaces on the brackets, and means including pins passing transversely through the bearing surfaces for pivotally connecting the ends of the rod to the brackets.

3. In combination, a vehicle frame member, an axle member, a bracket fastened to the frame member, a bracket fastened to the axle member, a tubular radius rod extending between the brackets, and having a side wall at each end curved to provide a bearing surface, complementary bearing surfaces on the brackets, an insert in each end of the rod along said bearing surface, and means including pins passing transversely through the bearing surfaces and inserts for pivotally connecting the ends of the rod to the brackets.

4. In combination, a vehicle frame member, an axle member, a bracket fastened to the frame member, a bracket fastened to the axle member, a tubular radius rod extending between the brackets and having flattened end portions, and means pivotally connecting the ends of the rod to the brackets including pins passing transversely through the flattened end portions of the rod, said pins having conical end portions on opposite sides of the rod and which have operative pivotal connection with the brackets.

5. In combination, a frame member, an axle member, a tubular radius rod for connecting the frame to the axle member and having transversely extending openings in its end portions, rubber bushings in said openings, and means including pin elements extending into said bushings for pivotally connecting the rod to the frame and axle members.

6. In combination, a frame member, an axle housing, a radius rod extending between the frame member and housing, means pivotally connecting the frame member to one end of the rod, a bracket pivotally connected to the other end of the rod, and means for rigidly fastening the bracket to the housing and including a U shape strap extending around the housing and having its ends connected to the bracket.

7. In combination, a frame member, an axle housing, a radius rod extending between the frame member and housing, means pivotally connecting the frame member to one end of the rod, a bracket pivotally connected to the other end of the rod, and means for rigidly fastening the bracket to the housing, and including complementary, interfitting portions on the housing and bracket shaped to prevent turning of the bracket and housing relatively about the axis of the latter.

8. In combination, a vehicle frame member, an axle member, a bracket fastened to the frame member, a bracket fastened to the axle member, a radius rod extending between the brackets and pivotally connected to one bracket and at its other end being shaped to provide a concave socket in one side thereof, the other bracket having a concavo-convex portion having its convex side seated in said recess, a bolt passing through the recess portion of the rod and through the concavo-convex portion of the bracket and having a rounded head seated in the concavity of said concavo-convex portion, and a nut on the other end of the bolt for holding the parts in position.

9. In combination, a vehicle frame member, an axle member, a bracket fastened to the frame member, a bracket fastened to the axle member, a radius rod extending between the brackets and pivotally connected to one bracket and at its other end being shaped to provide a concave socket in one side thereof, the other bracket having a concavo-convex portion having its convex side seated in said recess, a bolt passing through the recess portion of the rod and through the concavo-convex portion of the bracket and having a rounded head seated in the concavity of said concavo-convex portion, means locking the bolt to the rod for turning therewith, and a nut on the other end of the bolt for holding the parts in position.

10. In combination, a vehicle frame member, an axle member, a bracket fastened to the frame member, a bracket fastened to the axle member, a tubular radius rod extending between the brackets and having flattened end portions, and means pivotally connecting the ends of the rod to the brackets including pins passing transversely through the flattened end portions of the rod, said pins having enlarged conical end portions on opposite sides of the rod and which have operative pivotal connection with the brackets.

11. In combination, a frame member, an axle housing, a radius rod extending crosswise of the vehicle, means for pivotally connecting one end of the radius rod to the frame, and means for pivotally connecting the other end of the radius rod to the housing, the last-mentioned means comprising a bracket having two parts partly and jointly embracing the axle housing and welded thereto and terminating outwardly from the housing in a recessed, socket portion formed jointly by such parts, a third part releasably secured to the other parts and forming a complete socket receiving said other end of the rod, and rubber bushing means in the socket.

12. In combination, a frame member, an axle housing, a radius rod extending crosswise of the vehicle, means for pivotally connecting one end of the radius rod to the frame, and means for pivotally connecting the other end of the radius rod to the housing, the last-mentioned means comprising a bracket having two parts partly and jointly embracing the axle housing and welded thereto and terminating outwardly from the housing in a recessed, socket portion formed jointly by such parts, a third part releasably secured to the other parts and forming a complete socket receiving said other end of the rod, rubber bushing means in the socket, and a projection on the end of the rod and retained in the rubber bushing means in out-of-contact relation to the bracket parts.

JOHN W. LEIGHTON.